United States Patent [19]

Huse

[11] Patent Number: 5,383,644
[45] Date of Patent: Jan. 24, 1995

[54] REMOVABLE PEDESTAL

[75] Inventor: O. C. Huse, Arlington, Tex.

[73] Assignee: Moeller Marine Products, Goodlettsville, Tenn.

[21] Appl. No.: 48,404

[22] Filed: Apr. 14, 1993

[51] Int. Cl.6 ........................................... F16M 13/00
[52] U.S. Cl. ..................................... 248/523; 248/501
[58] Field of Search ................. 248/188.8, 188.1, 501, 248/503, 503.1, 523; 403/348, 349

[56] References Cited

U.S. PATENT DOCUMENTS

| 3,230,909 | 1/1966 | Watson | 248/188.1 X |
|---|---|---|---|
| 4,501,404 | 2/1985 | Nelson . | |
| 4,789,126 | 12/1988 | Rice et al. . | |
| 5,020,286 | 6/1991 | Hamar et al. . | |
| 5,087,011 | 2/1992 | Turner | 248/501 |
| 5,102,192 | 4/1992 | Barile, Sr. | 248/501 X |
| 5,121,891 | 6/1992 | Goldsmith . | |

FOREIGN PATENT DOCUMENTS 56-28088 3/1981 Japan .
221847 9/1924 United Kingdom .

Primary Examiner—Ramon O. Ramirez
Attorney, Agent, or Firm—Howard & Howard

[57] ABSTRACT

The present invention discloses an improved pedestal mounting assembly and in particular a pedestal mounting assembly that has a removable post. The post and base are locked together by opposed mounting teeth located respectively on the post and base. The post is inserted into the base, rotated through about 90° until the teeth engage locking the post to the base. To remove the post from the base, the post must be raised to disengage the teeth and permit rotation of the post with respect to the base. To facilitate mounting and release, a key and slot with stops are provided to control rotation and axial movement.

19 Claims, 3 Drawing Sheets

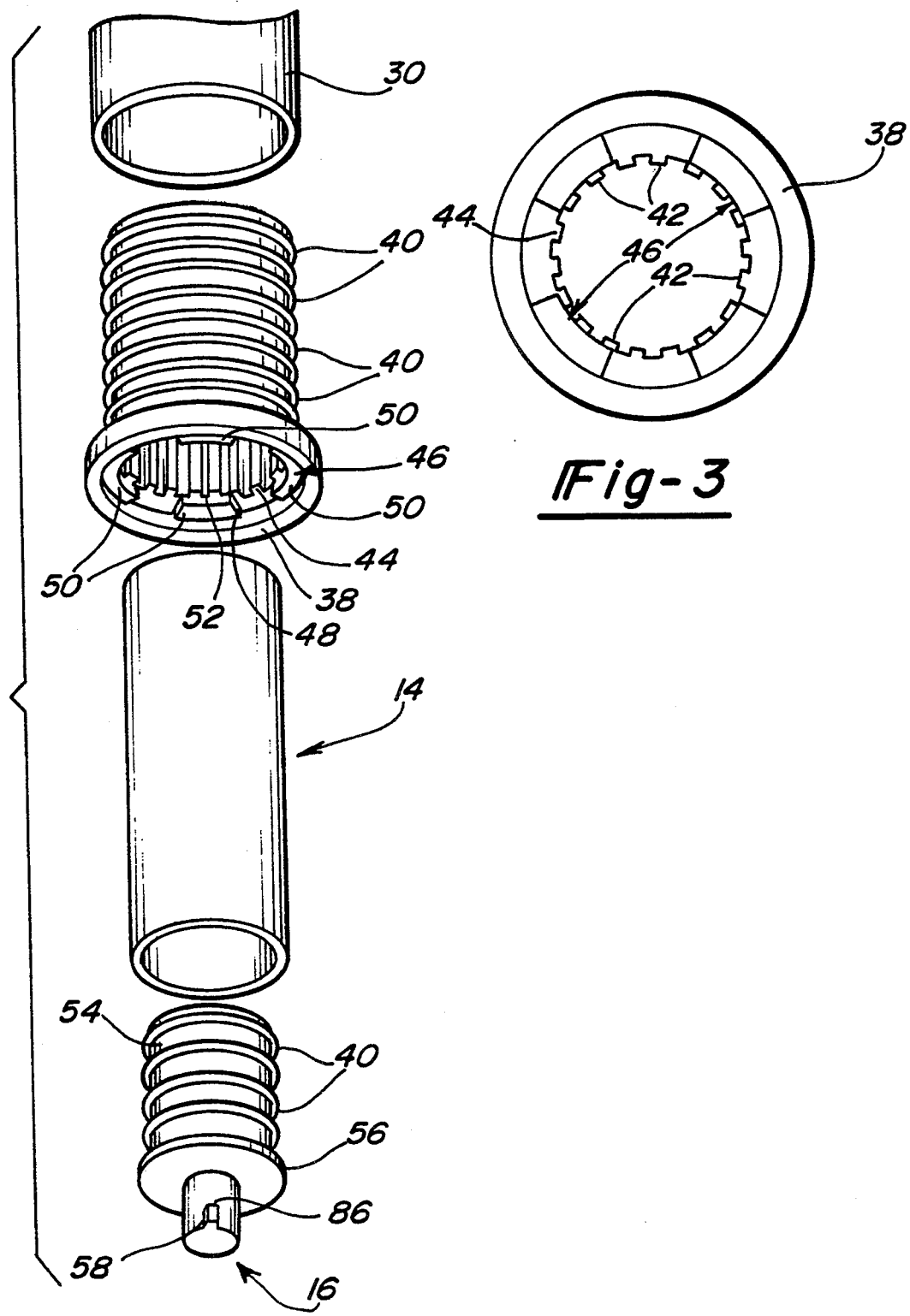

REMOVABLE PEDESTAL

BACKGROUND OF THE INVENTION

The present invention relates to a pedestal assembly for mounting for example seats, tables, etc. and more particularly to a pedestal that has a fixed support base and a removable post. The present invention is particularly useful in the boating industry, for example, for removably mounting pedestal type seats at various locations about the boat or for removably mounting a table or for providing various post heights for mounting seats, tables, beds, etc. at various heights.

Pedestal mounts are very popular in recreational vehicles by way of example, pedestal mounts are commonly used to mount seats in boats. This type of seating generally includes a seat, normally having a back and a seat base, that is attached to a post that is in turn connected to a base support that is mounted to the deck of the boat. The seat can be removed tom the post if desired, but the post and the base are fixed in place.

When the boat is manufactured at least one and generally a number of these pedestal type seats have to be provided. Since the posts are fixed, the manufacturer has to determine the number and location of the seats when the boat is being manufactured. The number and location of the seats are critical since there is limited space in the boat and because of the varying needs and tastes of boat owners. This problem is compounded when in addition to pedestal type seats, the boat also ha pedestal mounted tables etc. Typically, the manufacturer will make several boat styles that only differ in the number and placement of the seats and other pedestal mounted items.

This fixed post arrangement can also be a problem for boat owners. Again, the boat has limited space and fixed posts take up this space. Therefore, with more than one seat, for example, the boat owner has reduced his available space. However, with fewer seats, for example only one seat the boat owner gains space, but has reduced seating, limiting the number of occupants for his boat. Also, the location of the seats are fixed. If the boat owner wants to fish from one spot on his boat, he cannot sit down unless he ordered his boat with a seat in that location.

An additional problem is the theft of seats from boats with pedestal mounted seats that are not easy to remove from the boat while the boat is docked. Seats that are bolted to the pedestal are cheaper in that they do not need the additional cost of a mounting bracket having a quick release mechanism. These seats are not designed to be quickly removed; however, these seats can be removed by removing the attaching bolts and many boaters have returned to their boat to find that their seats have been stolen. Therefore, an inexpensive alternative is desirable for boat owners so that they can easily remove their boat seats.

SUMMARY OF THE INVENTION

The present invention overcomes the above problems by providing an easily removable pedestal mounting assembly that can be removed from a boat deck, or a floor if other than a boat is being used.

The pedestal mounting assembly of the present invention includes a pedestal base which is mounted to a surface, such as for example the deck of a boat. The pedestal base has a first mounting means for mating connection with the pedestal post which has a second mounting means. The pedestal post is mounted to the base by first engaging the first and second mounting means and then rotating them slightly so that the mounting means mate. The mounting means having a release position wherein the post can be removed from the base and a locked position wherein the post is locked with respect to the base. The post is only rotatable from the second or locked position to the release position after the post is axially-spaced a predetermined distance from the base. This prevents the post from being inadvertently rotated from the locked position to the release position.

The pedestal base has a top surface and a bottom surface with a bore extending through both the top and bottom surfaces. The top surface of the base has the first mounting means which is a plurality of circumferentially-spaced teeth. The bottom surface of the base has a key slot. The key slot is formed in a reduced diameter portion of the bore. A pair of stops are mounted on each side of the key slot to control rotation of the post.

The pedestal post has opposed ends with one of the ends having the second mounting means for mating with the first mounting means. This second mounting means has a complimentary set of circumferentially-spaced teeth which, when properly aligned with the teeth of the first mounting means, mate in such a way that the radial sidewalls of all the teeth are in engagement. This mating engagement locks the post in the base and prevents the post from rotating with respect to the base.

The pedestal post is insertable into the bore in a first position wherein the key and the key slot are aligned and the teeth are not mating. The post can then be rotated to a second position corresponding to the mounting means being mated and the post being secured to the base so that the post is non-rotatable. To rotate the post from the locked position to the unlocked release position, the post has to be raised slightly to disengage the teeth and then the post can be rotated.

In the preferred embodiment of the present invention, the sidewalls of one set of teeth are angled with respect to vertical so that the engagement between the teeth frictionally increases as the post is forced into the base. In this way, the heavier an object, as for example a person sitting on a seat mounted to the post, the greater the locking effect between the post and the base.

In the preferred embodiment, the pedestal assembly has a post of a first diameter with a first extension of a reduced diameter projecting from it and a short second extension having an even smaller diameter extending from the first extension. The short extension has a key projecting laterally from it. Both extensions are adapted to fit into the bore of the base member and to rotate between the locked and release positions. The key is adapted to fit into the key slot in the reduced diameter section of the bore and to engage the stops as the post is rotated between the locked and unlocked positions. The overall length of the extensions is slightly greater than the length of the bore plus the height of the teeth of the first and second mounting means. In this way, the second post can be inserted into the base in the first position with the key and key slot aligned and rotated to the second position wherein the teeth engage and lock the post into the base. To rotate the post back to the unlocked or release position, so the key and slot can be aligned and the post removed, the post must be raised to disengage the teeth so that they can rotate with respect to each other.

As should be appreciated by those of ordinary skill in this art, the present invention provides tremendous advantages for the manufacturer as well as the owner of a boat or other recreational vehicle. A boat or van or RV can be manufactured with a plurality of pedestal bases strategically located for ultimate user pleasure and convenience. The owner can then obtain as many accessories as desired and plug them into the bases as desired. An owner can move seats, tables, beds, etc. about the boat and can have various heights for each, depending upon the height of the post. When the boat is left unattended, the accessories can be quickly and easily removed. The owner can also use the accessories interchangeably among various recreational vehicles having complimentary base supports. The accessories could even be used outside the vehicles on portable ground supports if desired.

DESCRIPTION OF THE DRAWINGS

FIG. 2 is an exploded perspective view of the first mounting means of the pedestal assembly of the present invention and the first and second extensions.

FIG. 3 is a front view of the first mounting means of the present invention.

DETAILED DESCRIPTION OF THE INVENTION

Figure 1:
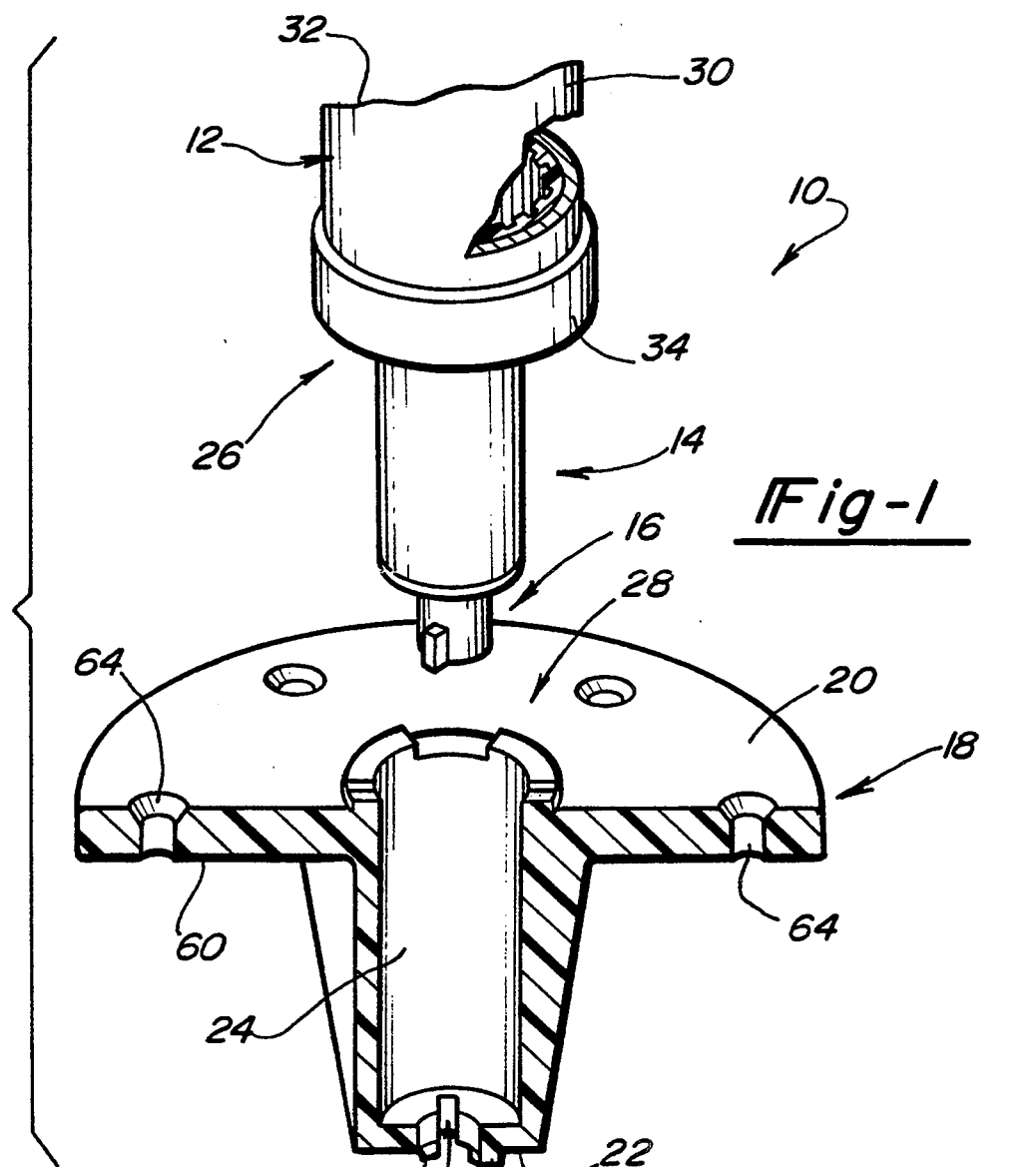
FIG. 1 is a perspective partially cut away view of the pedestal mounting assembly of the present invention.

The pedestal assembly of the present invention is shown generally at 10 in FIG. 1. The assembly includes a pedestal post 12 having first and second extensions 14 and 16 and a base 18. The pedestal base has a top surface 20 and a bottom surface 22 with a bore 24 extending through both the top and the bottom surfaces. The pedestal post 12 is adapted to be inserted into the pedestal base 18 rotated through approximately 90° and locked in place so that it cannot be removed and so that it cannot be rotated or vertically deflected with respect to the vertical centerline of the assembly. A first mounting means 26 is mounted to the pedestal post 12 and a second mounting means 28 is formed on pedestal base 18 to provide this locking engagement.

The pedestal post 12 includes a main post 30 which in the preferred embodiment is a round tube having opposed ends 32 and 34. Preferably, post 30 is made of aluminum. Mounted in opposed end 34 is the first mounting means 26. With reference to FIGS. 2 and 3, the first mounting means 26 will be described in greater detail.

First mounting means 26 is generally tubular in shape and is formed of plastic and has a body portion 36 and an annular flange 38. The body portion 36 includes a series of ridges 40 which when inserted into main post 30 frictionally engage the post so that there is a slip fit connection between mounting means 26 and main post 30. Extending longitudinally into annular flange 38 and body portion 36 are ribs 42. These ribs are adapted to frictionally engage first extension 14. In this way, first extension 14 can be inserted into first mounting means 26 and mounted in place without the need for fasteners or adhesives. In the preferred embodiment extensions 14 and 16 are aluminum tubes.

Between the bore of first mounting means 26 and annular flange 38, there is a recessed portion 44. This recessed portion 44 has a first set of locking teeth 46 mounted within it. Locking teeth 46 have radial sides 48, a top 50 and a circumferential face 52. As will be described in greater detail below, the locking teeth 46 are adapted to mate with a second set of locking teeth 60 formed on base 18.

In the preferred embodiment, the first extension 14 is also a tubular member having an outer diameter which is less than the outer diameter of main post 30. Mounted within the end of first extension 14 is a second extension 16. With reference to FIG. 2, second extension 16 has a body portion 54, a flange 56 and a key 58. As before, the body portion 54 includes ribs 40 which permit easy slip fit assembly of the second extension 16 into the bore of the first extension 14. The body portion 54 and ribs 40 are preferably formed of plastic with extension 16 being formed of aluminum.

Figure 4:
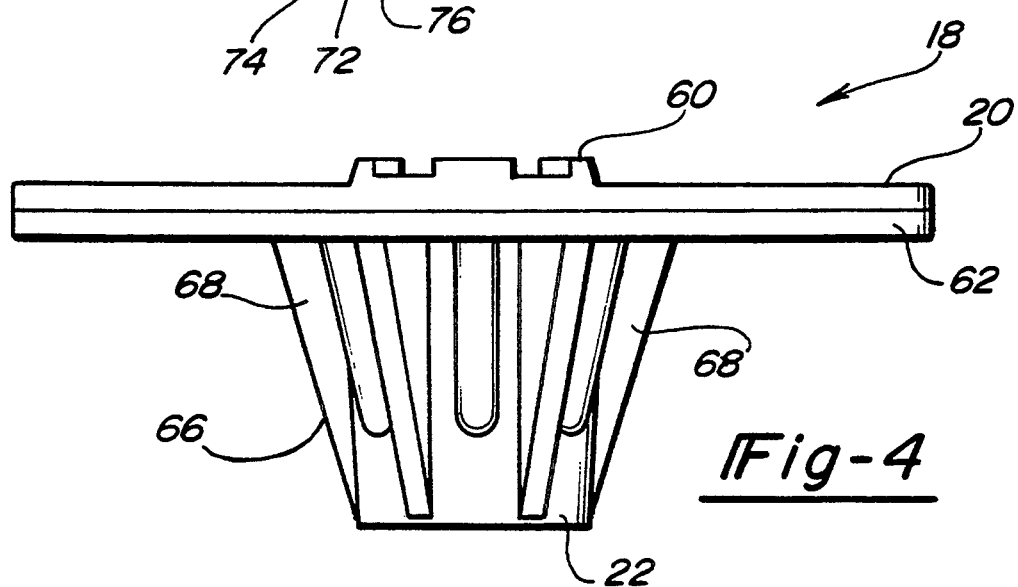
FIG. 4 is a side view of the base member.
Figure 5:
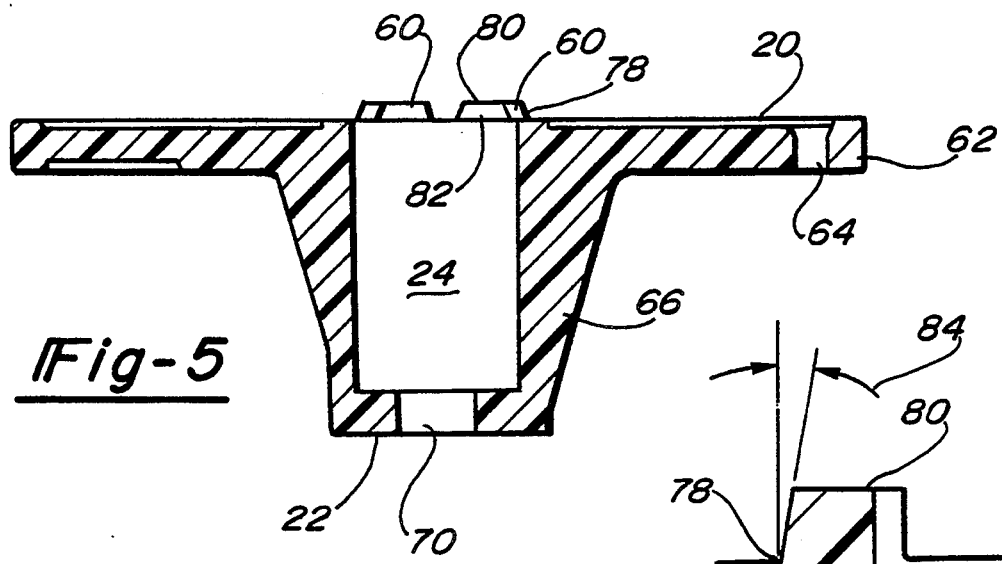
FIG. 5 is a cross-section of the base member illustrated in FIG. 4.

With reference to FIGS. 4 and 5, the pedestal base 18 will be described in greater detail. Base 18 is preferably made of plastic and includes a mounting flange 62 which is adapted to lie flat upon a floor or boat deck. Mounting flange 62 in the disclosed embodiment includes fastener apertures 64 for receipt of fasteners for fastening the pedestal base 18 to a floor, surface or deck. The base 18 includes a body portion 66 extending between top surface 20 and bottom surface 22. Bore 24 extends through the pedestal base 18. As illustrated, the body portion 66 is reinforced with reinforcing ribs 68. The reinforcing ribs provide support between the body portion 66 and the mounting flange 62. As should be appreciated by those of ordinary skill in the art, when the pedestal post 12 is locked into pedestal base 18, any forces applied to the opposite end of the pedestal post 12 will be resisted through the pedestal base and in particular at the fastener apertures 64 and between the body portion 66 and mounting flange 62. Therefore, reinforcing ribs 68 are provided to assist in resisting forces applied to post 12.

With reference to FIG. 5, it can be seen that bore 24 reduces in diameter at 70. The reduced portion may be formed integrally with the pedestal base or it may be formed by placing a disk having an outer diameter slightly greater than the inner diameter of bore 24 into the base of bore 24 to reduce the diameter.

Figure 7:
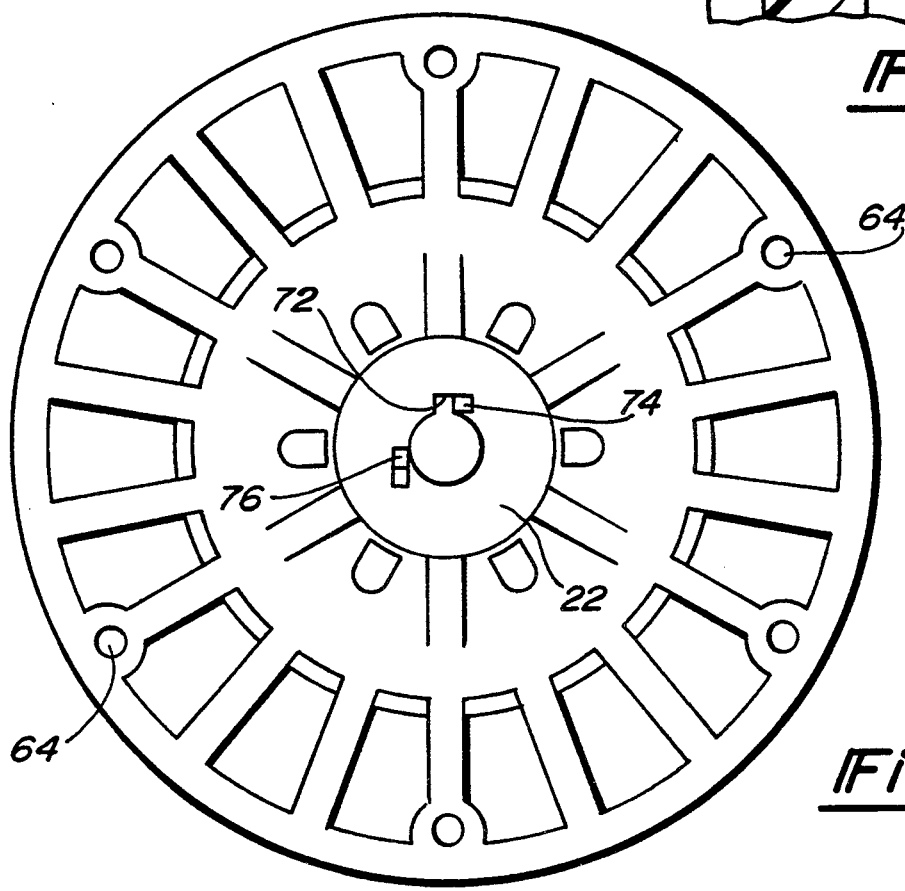
FIG. 7 is a bottom view of the base member.

Referring to FIG. 7, it can be seen that the reduced diameter base portion includes a key slot 72 which is adapted to receive key 58 on second extension 16. Mounted adjacent key slot 72 is a first stop 74 and mounted about 90° away from first stop 74 is a second stop 76. These stops control the rotational movement of pedestal post 12 between a 90° arc. Circumferentially-spaced about the bores 24 and protruding from the top surface 20 Of pedestal base 18 is the second set of locking teeth 60. As with the first set of locking teeth, these teeth are circumferentially-spaced and include radial sides 78, top portions 80 and circumferential faces 82. In the preferred embodiment, there are four spaced teeth on the post 12 and base 14 and the opposed teeth are approximately 90° out of phase with one another.

Figure 6:
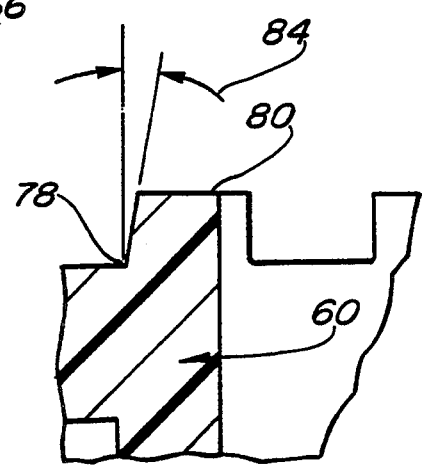
FIG. 6 is a partial cut away view of the second locking means of the present invention illustrating the sloped teeth.

With reference to FIG. 6, in the preferred embodiment of the present invention, the second set of teeth 60 have the radial sidewalls 78 angled through approximately 10°. This angle is shown generally at 84. The purpose of the slope to the radial sidewalls is so that when the first set of teeth are rotated into place with the sidewalls 78 and 48 engaged, they engage near the top of teeth 60, along sidewall 78. As weight is applied to the pedestal post 12, the teeth cam against one another along the slope and the frictional inner connection increases forming a tighter fit. In this way, regardless of the amount of weight applied to the post, the locking between the sets of teeth 46 and 60 increases automatically.

In use, the opposed end 32 of post 12 will have for example a seat or table top mounted to it by known mounting means. The post will be inserted into bore 24 so that key 58 aligns with key slot 72. When properly aligned, key 58 will allow post 12 to fully fit into base 18. In the preferred embodiment, the length of the portion of post 12 between flange 38 and the inner portion 86 of key 58 is slightly greater than the length of the base 18 measured from the top 80 of teeth 60 to bottom face 22. In this way, the key is completely received by base 18 and slightly spaced from bottom surface 22 so that post 12 can be rotated.

Once inserted, post 12 is rotated through approximately 90° allowing the opposed sets of teeth 46 and 60 to mate, i.e. their sidewalls 48 and 78 respectively engage to prevent further rotation. The second stop 76 is necessary to assist in properly aligning the opposed teeth 46 and 60. As should be appreciated, if post 12 were held slightly away from base 18 as the post is rotated, post 18 could be rotated beyond the teeth requiring some effort to align the teeth if stop 76 were not present. To remove the post from the pedestal base, the post is raised slightly so that the opposed teeth 46 and 60 are disengaged, rotated to stop 72 and raised out of base 18. As should be appreciated, a very simple and easy removal process, but a pedestal assembly which only permits the pedestal post to be removed from the base when desired. If the post is not raised, the opposed teeth 46 and 60 remain locked, preventing removal of the post.

As should be appreciated by those of ordinary skill in the art, the above is a description of the preferred embodiment of the invention, but is not to be read in a limiting way, the invention only being limited by the appended claims.

What is claimed is:

1. A pedestal assembly comprising:
    a pedestal base fixedly mounted to a surface, said pedestal base having a top surface and a bottom surface and a bore extending through said top and bottom surfaces, said top surface of said base having a first mounting means and said bottom surface of said base having a key slot therein;
    a pedestal post for mounting to said pedestal base, said post having opposed ends with one of said ends having a second mounting means for mating with said first mounting means and a key at a second of said ends adapted to be received within said key slot;
    said pedestal post being insertable into said bore in a first position wherein said key and said key slot are circumferentially aligned and said mounting means are not mating, said pedestal being rotatable to a second position at which said mounting means being mated, and at which said key being non-aligned with said key slot and on an opposed side of said slot from said first mounting means and said post being secured to said base such that said post is rotatably locked into said base.

2. The pedestal assembly of claim 1, wherein said first and second mounting means have opposed spaced teeth which in said second position are aligned with respect to one another such that said opposed space teeth are Juxtaposed with respect to one another.

3. The pedestal assembly of claim 2, wherein said opposed spaced teeth have radial sidewalls with each of said radial sidewalls engaging an adjacent radial sidewall when said post is in said second position.

4. The pedestal assembly of claim 3, wherein said radial sidewalls of one of said mounting means are angled with respect to vertical so that said engagement frictionally increases as said post is forced into said base.

5. The pedestal assembly of claim 1, wherein said first and second mounting means have opposed spaced teeth which in said second position are juxtaposed with respect to one another;
    said opposed spaced teeth having radial sidewalls with each of said radial sidewalls engaging an adjacent radial sidewall when said post is in said second position;
    said radial sidewalls of said first mounting means being angled with respect to vertical so that said sidewalls of said first and second mounting means cam against one another as said post is forced downwardly into said base such that said post is more securely mounted within said base as greater weight is applied to said post.

6. The pedestal assembly of claim 1, wherein said second mounting means includes a first insertable member that is adapted to be inserted into said one opposed end of said post, said insertable member being generally tubular with an annular flange at one end, said flange having an outer diameter that is greater than the outer diameter of said post, said flange having opposed spaced teeth therein; and
    a projection having an outer diameter slightly less than the inner diameter of said bore and slightly greater than the inner diameter of the bore of said first insertable means such that said projection can be slip fit within said bore of said first insertable member.

7. The pedestal assembly of claim 6, wherein said post further includes an extension extending outwardly from said projection, said extension having a first end mounted to said projection and a second end having said key means thereon.

8. The pedestal assembly of claim 1, wherein said post is only rotatable from said second position to said first position after said post is axially-spaced a predetermined distance from said base, whereby said post cannot inadvertently be rotated from said second position to said first position.

9. The pedestal assembly of claim 2, wherein said post is only rotatable from said second position to said first position after said post is axially-spaced from said base to axially separate said opposed spaced teeth.

10. A pedestal mounting assembly comprising:
    a pedestal base fixedly mounted to a surface, said pedestal base having a first mounting means;
    a pedestal post for mounting to said pedestal base, said post having opposed ends with one of said ends having a second mounting means for mating with said first mounting means;
    said pedestal post being mountable to said base by mating said first and second mounting means, said mounting means having a releasable position wherein said post can be removed from said base and a locked position wherein said post is non-rotatable, said post being rotatable between said first and second positions; and said first and second mounting means having opposed spaced teeth which in said second position are aligned with respect to one another such that said opposed spaced teeth are adjacent to one another.

11. The pedestal assembly of claim 10, wherein said post is only rotatable from said locked position to said releasable position after said post is axially-spaced a predetermined distance from said base, whereby said post cannot inadvertently be rotated from said locked position to said releasable position.

12. The pedestal assembly of claim 10, wherein said first and second mounting means frictionally engage one another in said second position.

13. The pedestal assembly of claim 12, wherein said frictional engagement increases with increased weight upon said post.

14. The pedestal mounting assembly of claim 11, wherein said base has a key slot and said post has a mating key, said key mating with said slot in said releasable position and restraining said post with respect to said base when said post is inserted, but not in said releasable position.

15. The pedestal mounting assembly of claim 10, wherein said opposed spaced teeth have radial sidewalls extending generally parallel to the longitudinal centerline of said post, each of said radial sidewalls engaging an adjacent radial sidewall when said post is in said second position.

16. The pedestal mounting assembly of claim 15, wherein said radial sidewalls of one of said mounting means are angle with respect to vertical so that said engagement frictionally increases as said post is forced into said base.

17. A pedestal mounting assembly comprising:
a pedestal base fixedly mounted to a surface, said pedestal base having a first mounting means;
a pedestal post for mounting to said pedestal base, said post having opposed ends with one of said ends having a second mounting means for mating with said first mounting means;
said pedestal post being adapted to be mounted to said base by mating said first and second mounting means, said mounting means having a releasable position wherein said post can be removed from said base and a locked position wherein said post is non-rotatable, said post being rotatable between said releasable and locked positions;
said base and post having selectively circumferentially mating key means axially spaced from said first and second mounting means which when mated permit said post to axially move between first and second positions when said key means are circumferentially aligned, said second position being the axial position corresponding to said locked position and said first position permitting rotation between said releasable and locked positions, said key means being circumferentially non-aligned in said locked position.

18. The pedestal mounting assembly of claim 17, wherein said first and second mounting means have opposed spaced teeth which in said locked position are aligned with respect to one another;
said opposed spaced teeth having radial sidewalls with each of said radial sidewalls engaging an adjacent radial sidewall when said post is in said locked position;
said radial sidewalls of one of said first and second mounting means being angled with respect to vertical so that said sidewalls cam against one another as said post is forced downwardly into said base such that said post is more securely mounted within said base as greater weight is applied to said post.

19. The pedestal mounting assembly of claim 18, wherein said first position corresponds to said opposed spaced teeth being separated such that said teeth can rotate with respect to one another.

* * * * *